United States Patent [19]

Lancaster et al.

[11] Patent Number: 4,856,834
[45] Date of Patent: Aug. 15, 1989

[54] FIRE HOSE GRIPPING DEVICE AND PROCESS FOR FIGHTING FIRES IN OIL REFINERIES AND THE LIKE

[75] Inventors: David R. Lancaster, Casper; Richard J. Everding, Evansville, both of Wyo.

[73] Assignee: Amoco Corporation, Chicago, Ill.

[21] Appl. No.: 73,526

[22] Filed: Jul. 15, 1987

[51] Int. Cl.$^4$ .............................................. B65G 7/12
[52] U.S. Cl. ...................................... 294/15; 294/92; 169/46
[58] Field of Search ...................... 294/15, 1.1, 92, 18, 294/16, 19.1; 401/137, 139; 239/532; 15/105, 236 R; 169/46, 5, 13

[56] References Cited

U.S. PATENT DOCUMENTS

| | | | |
|---|---|---|---|
| 2,097,683 | 11/1937 | Armstrong | 294/92 |
| 2,694,454 | 11/1954 | Eickmeyer | 169/13 |
| 3,708,196 | 1/1973 | Snell | 294/92 |
| 4,655,492 | 4/1987 | Landry | 294/15 |

*Primary Examiner*—James B. Marbert
*Attorney, Agent, or Firm*—Thomas W. Tolpin; William H. Magidson; Ralph C. Medhurst

[57] ABSTRACT

A quick release clamp is provided to easily receive, slide upon and secure a fire hose without any moving parts. The quick release clamp has a comfortable handle and substantially reduces fatigue of firemen who need to hold the hose for long periods of time to quench a fire.

5 Claims, 8 Drawing Sheets

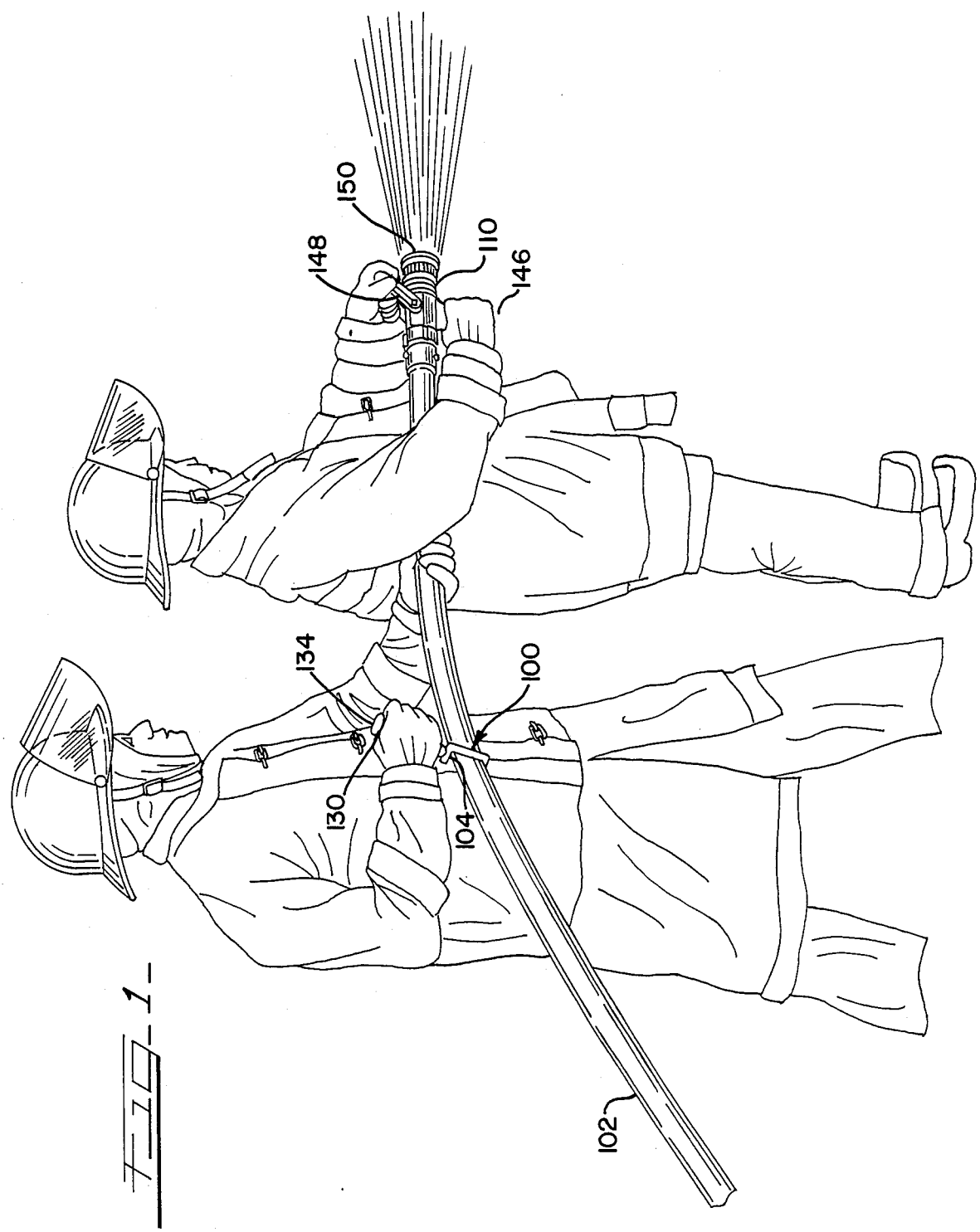

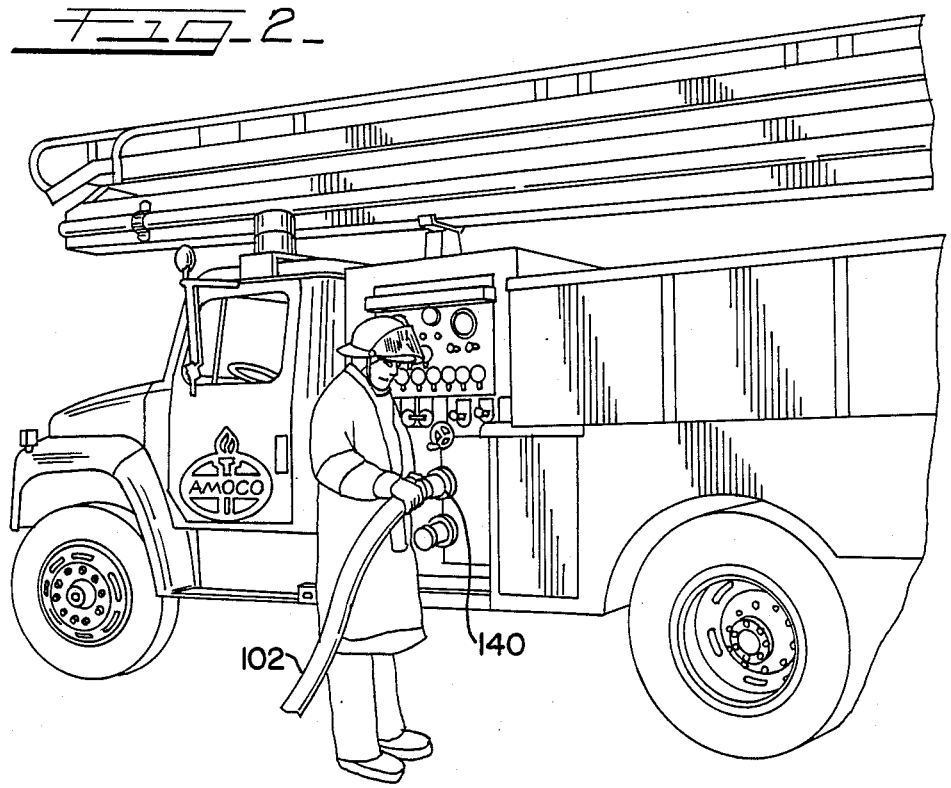
FIG_2
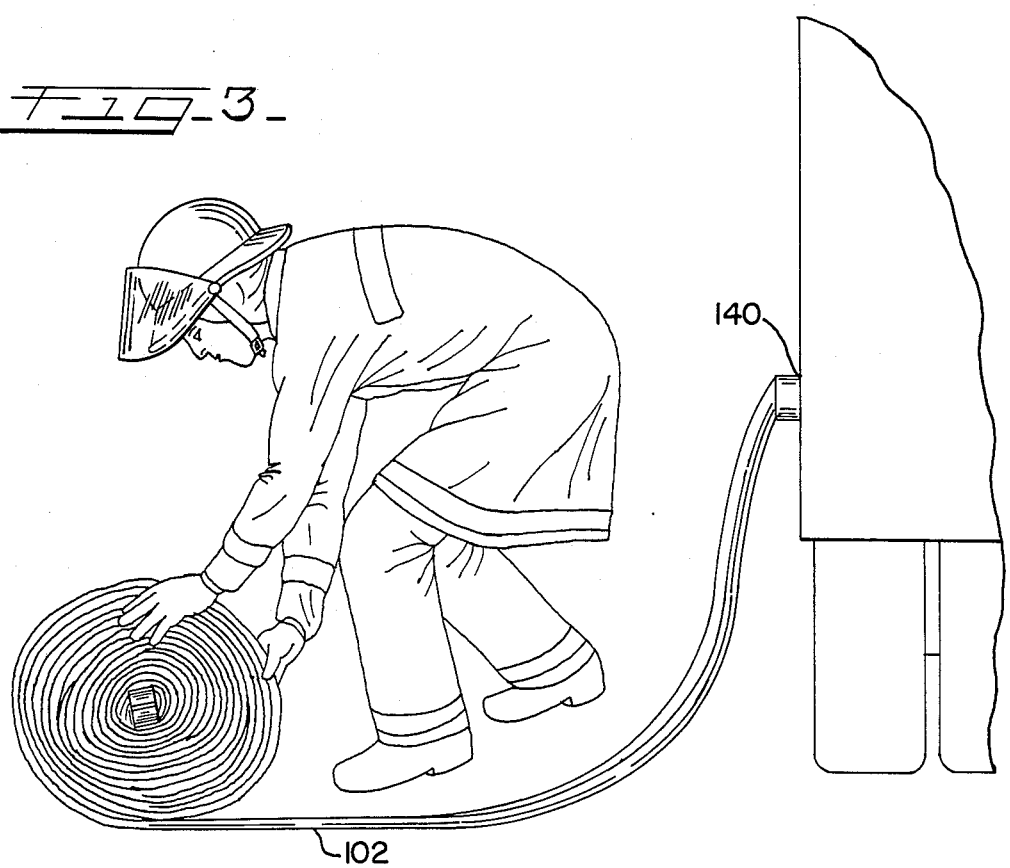
FIG_3

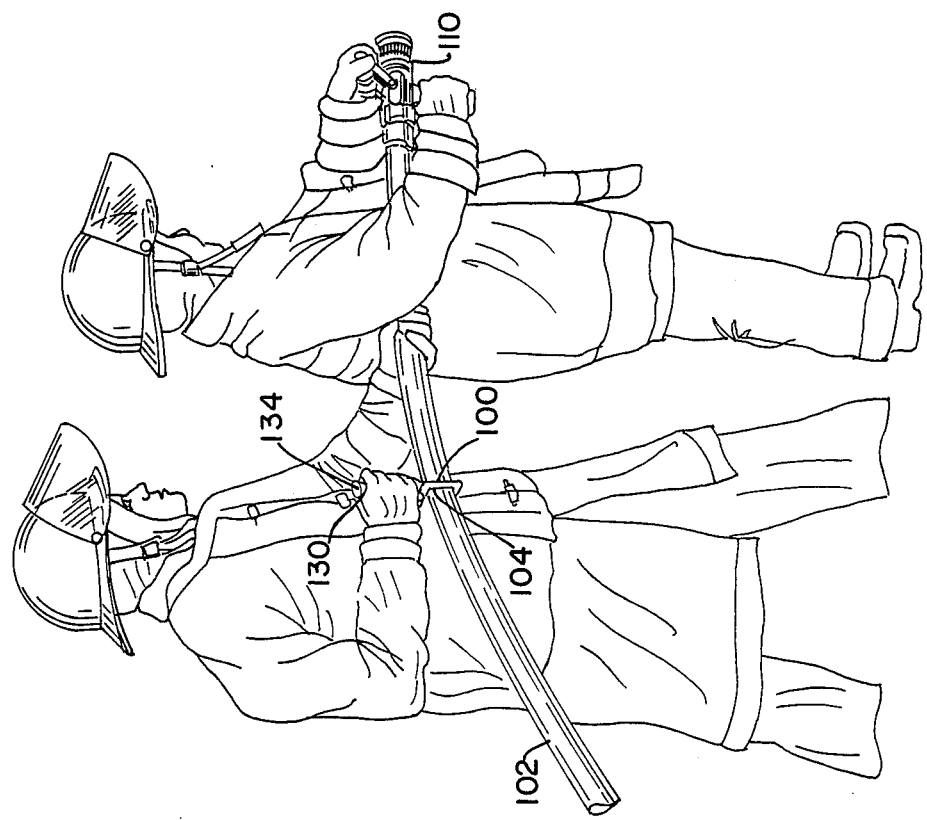
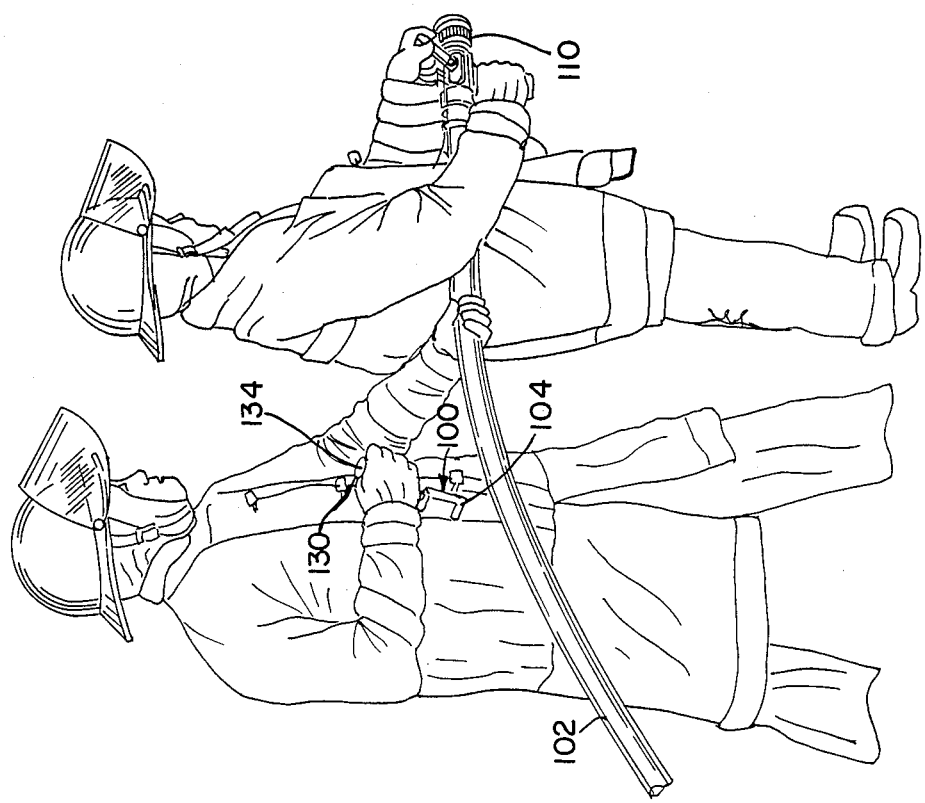

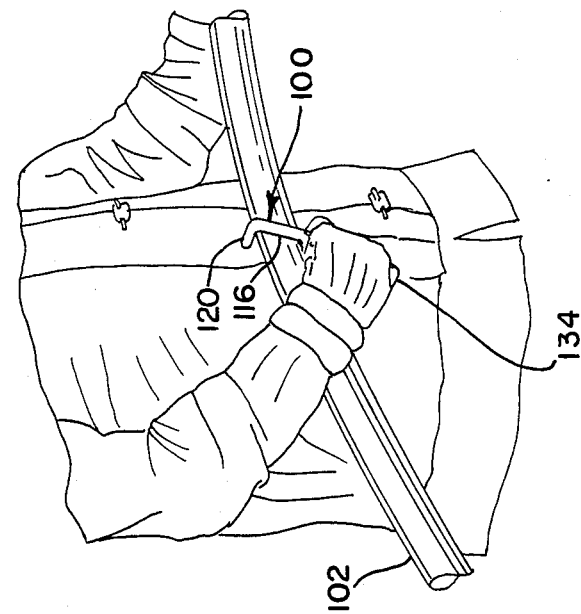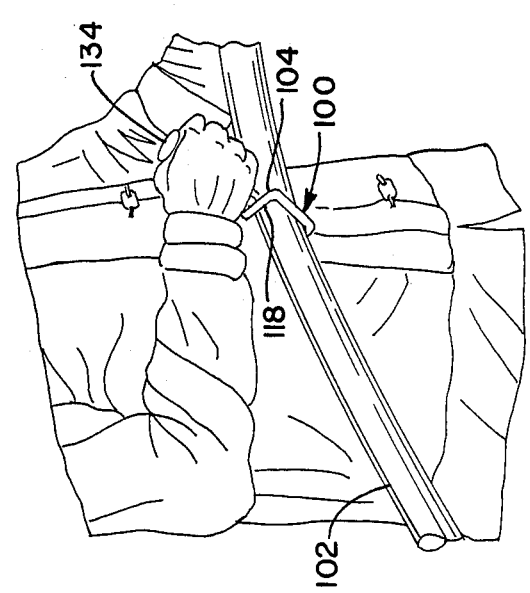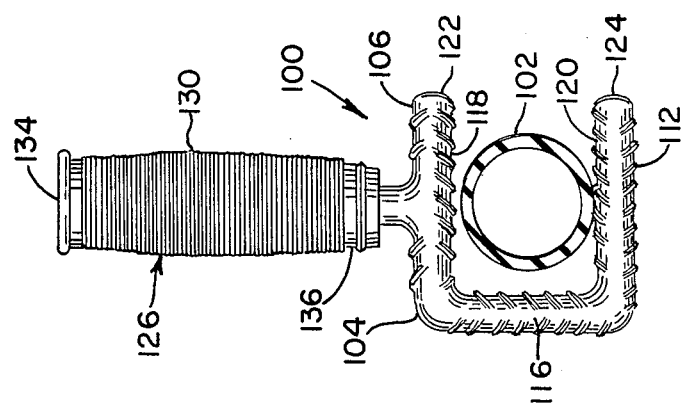

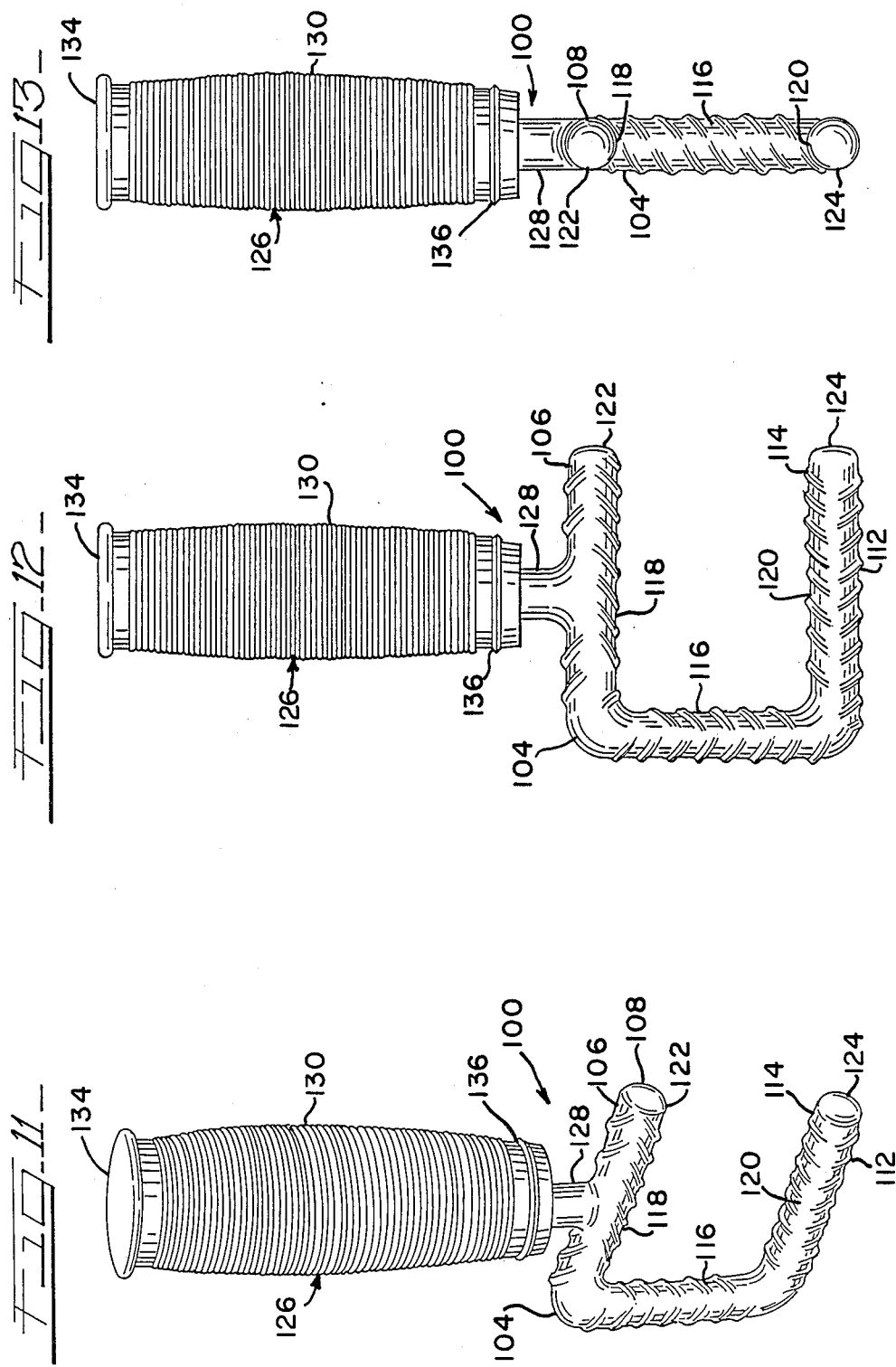

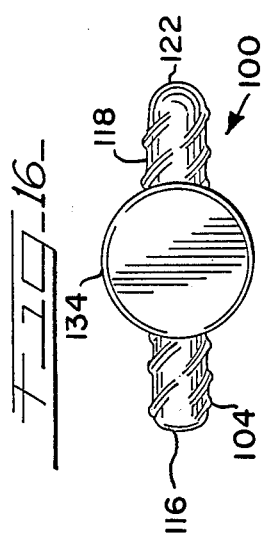
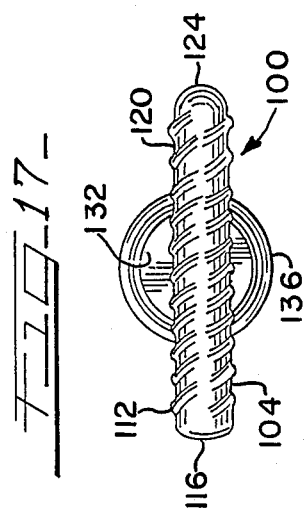
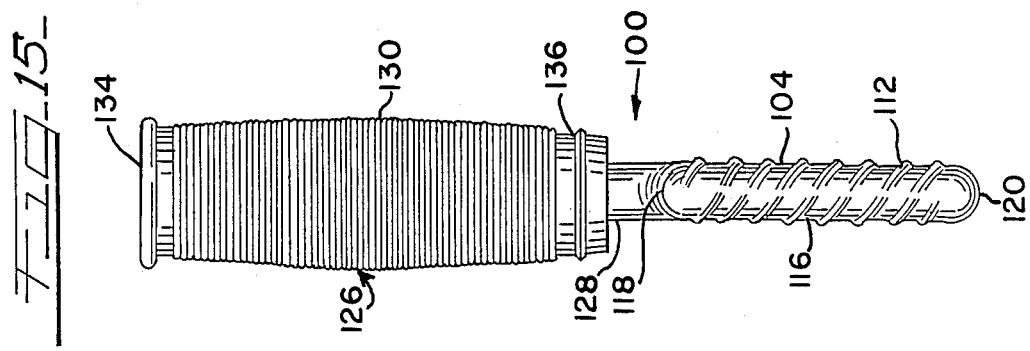
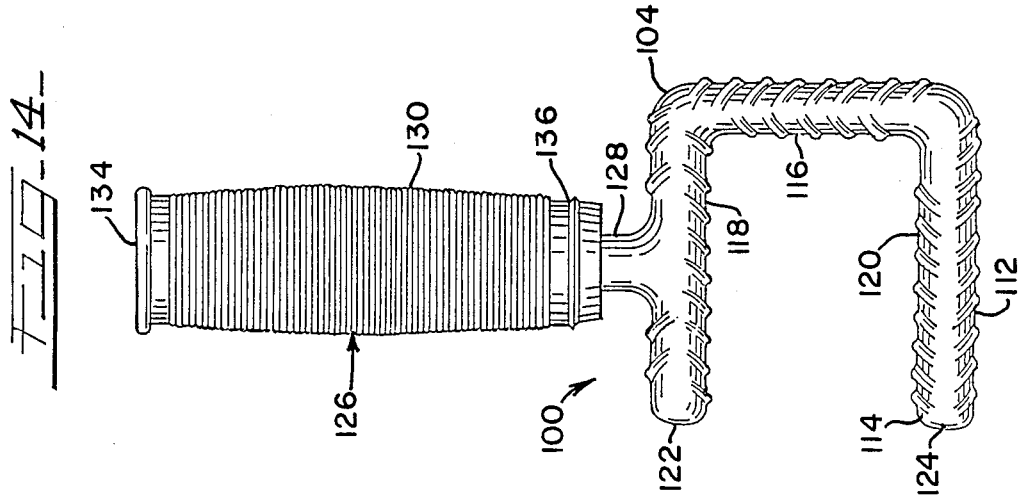

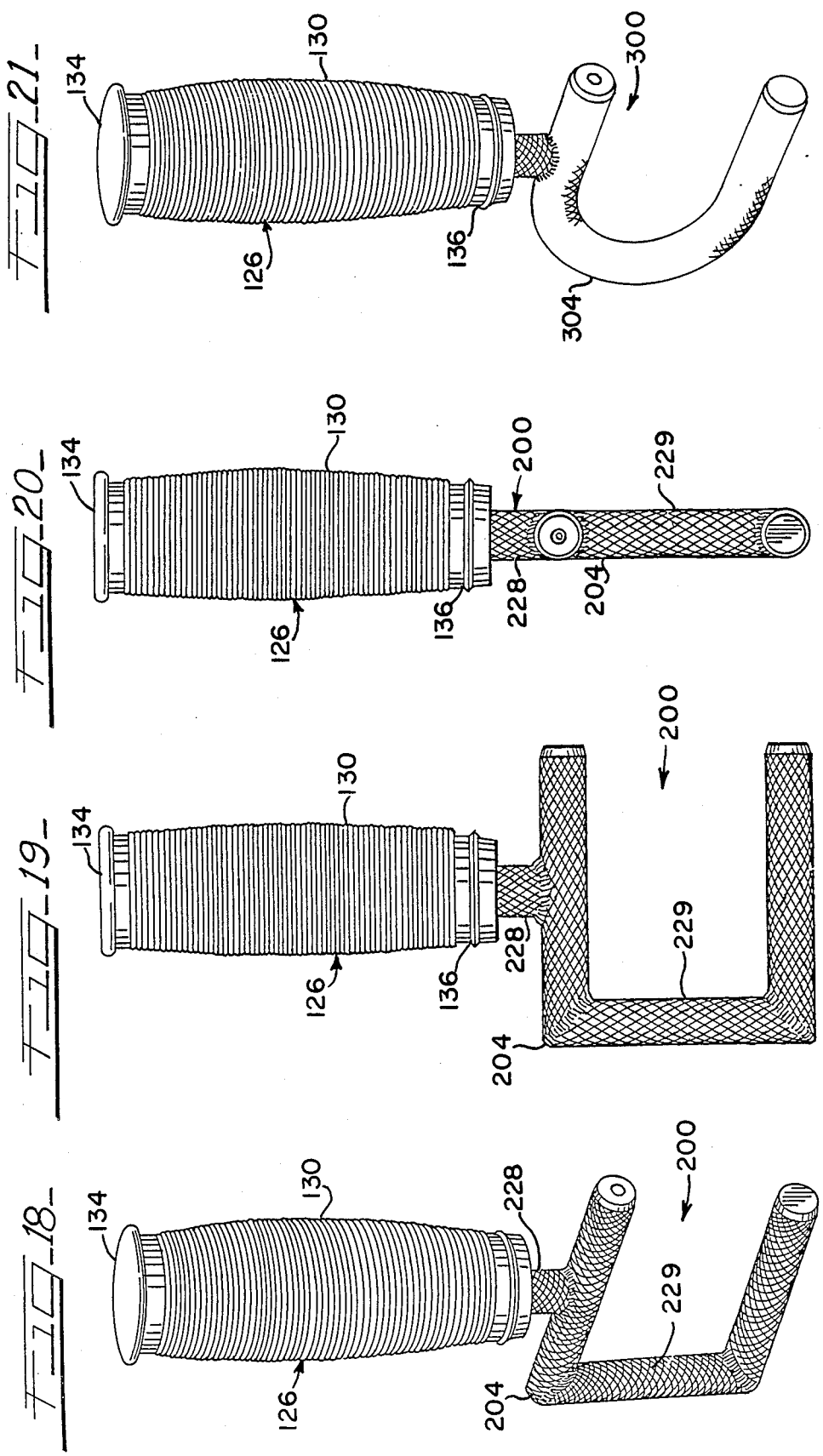

FIRE HOSE GRIPPING DEVICE AND PROCESS FOR FIGHTING FIRES IN OIL REFINERIES AND THE LIKE

BACKGROUND OF THE INVENTION

This invention pertains to firefighting equipment and, more particularly, to fire hose gripping devices and a process for extinguishing fires.

Fires in oil refineries and petrochemical plants are similar but different in many respects than fires in homes, apartments, warehouses, high rises and other office buildings. Fires in homes, apartments, warehouses, high rises, and other office buildings occur primarily in the inside of the buildings, although the flames can rise above the buildings' exteriors. Fires in oil refineries and petrochemical plants, as well as in inside structures, often emit enormous flames, fireballs, billows of smoke, immense heat, and clouds of noxious toxic gases.

Fires in oil refineries and petrochemical plants occur primarily on the outside and in the open air where there are gusts of wind and an endless supply of air to support combustion. Fires in oil refineries and petrochemical plants often involve or are near large amounts of fuel and process equipment which can feed the fire and/or cause enormous explosions. These sources of combustible fuel can include aboveground tanks containing gasoline, oil, petrochemical feedstocks, and other hydrocarbons, as well as numerous oil pipelines and gas lines. Refinery process equipment typically includes hydrotreaters which contain hydrogen-rich gases at high pressures and temperatures, catalytic cracking units, pipe stills, fractionating columns, combustors, regenerators, furnaces, CO boilers, alkylation units, and/or isomerization units.

Fires in oil refineries and petrochemical plants are extremely dangerous. They can cause extensive damage to a refinery or petrochemical plant as well as to property in adjacent areas. Such fires and explosions can also cause death and severe injuries to personnel in the refinery or petrochemical plant and nearby persons.

Fire hoses are often required to be manually held, lifted, and grasped for long periods of time, sometimes for six hours or more, while fighting and extinguishing fires in oil refineries and petrochemical plants, as well as in inside structures such as apartment buildings, warehouses, high rises, etc. Such work is tiresome, cumbersome, and difficult. Fatigue often occurs. Furthermore, water sprayed on the fire hose because of winds or rain often makes it difficult to grasp the hose. Hose slippage is frequent.

Over the years a variety of fire hose clamps, fittings, slings, and gripping devices have been used for gripping fire hoses. Typifying some of these fire hose clamps, fittings, slings, and gripping devices for gripping fire hoses or for other purposes, are those shown in U.S. Pat. Nos. 96,682; 850,983; 1,944,868; 2,038,701; 2,243,387; 2,329,711; 2,349,887; 2,655,300; and 4,085,876. These prior art fire hose clamps, fittings, slings, and gripping devices have met with varying degrees of success. Most prior art fire hose clamps, fittings, slings, and gripping devices, however, are awkward, bulky, difficult to attach, adjust, remove, uncomfortable to hold, and/or are not very effective in reducing fireman fatigue.

It is, therefore, desirable to provide an improved process and fire hose gripping device which overcomes most, if not all, of the preceding problems.

SUMMARY OF THE INVENTION

An improved firefighting process utilizes a special fire hose gripping device to reduce fatigue of firemen who need to hold a fire hose for long periods of time to quench a fire. The improved process and fire hose gripping device are particularly useful in fighting fires in oil refineries, petrochemical plants, and large structures outdoors. Advantageously, the improved process and fire hose gripping device are efficient, economical, and effective.

The fire hose gripping device comprises a unique, compact, portable quick release clamp, without any moving parts, which can easily receive, slide upon and secure a fire hose. The fire hose gripping device has a generally U-shaped, open ended member which engages the fire hose and a handle which extends outwardly to lift and carry the fire hose in the U-shaped member. For easy access and removal of the fire hose, the open end of the U-shaped member provides an opening (mouth) that spans a distance greater than the maximum transverse diameter of the filled expanded fire hose. For additional comfort, the handle can be elastomeric and resilient.

In use, after one end of the hose is attached to a fire truck or other water supply source and a spray nozzle is coupled to the other end of the hose, the valve at the water supply source is opened to fill and expand the hose to a semirigid position. The hose-engaging member of the gripping device is inserted transversely across the width of the hose, while holding the handle of the gripping device and an adjacent portion of the filled fire hose. Desirably, there is sufficient clearance between a portion of the gripping member and the hose to slide the gripping device to different positions along the hose. In order to securely lock and clamp the gripping device to the hose, the gripping device is moved at an acute angle of inclination relative to the hose, such as forward towards or rearwardly away from the nozzle or by twisting the gripping device, so that the normal effective span and opening of the gripping device is slightly less than the filled diameter of the hose. The hose can be raised by lifting the handle of the gripping device before discharging (spraying) water from the nozzle onto the fire. The handle of the gripping device can be positioned upwardly, downwardly, laterally, or transversely as preferred by the fireman for maximum comfort.

The gripping device provides greater support and control of the fire hose. It also requires fewer firemen to handle and control the hose.

A more detailed explanation of the fire hose gripping device and process are provided in the following description and appended claims taken in conjunction with the accompanying drawings.

BRIEF DESCRIPTION OF THE DRAWINGS

FIG. 1 is a perspective view of a fire hose gripping device in accordance with principles of the present invention;

FIG. 2 is a perspective view of the fire hose being connected to a fire truck;

FIG. 3 is a perspective view of the fire hose being uncoiled;

FIG. 6 is a perspective view of the fire hose being lifted off the ground;

FIG. 7 is a perspective view of the fire hose gripping device inserted on the hose;

FIG. 8 is a cross-sectional view of the hose with the gripping device inserted thereon;

FIG. 9 is a perspective view of the gripping device twisted relative to the fire hose;

FIG. 10 is a perspective view of the gripping device with its handle moved rearwardly away from the nozzle;

FIG. 11 is an enlarged perspective view of the fire hose gripping device;

FIG. 12 is a front view of the gripping device;

FIG. 13 is an open end view of the gripping device;

FIG. 14 is a back view of the gripping device;

FIG. 15 is a closed end view of the gripping device;

FIG. 16 is a top view of the gripping device;

FIG. 17 is a bottom view of the gripping device;

FIG. 18 is a perspective view of another fire hose gripping device in accordance with principles of the present invention;

FIG. 19 is a front view of the gripping device of FIG. 18;

FIG. 20 is an open end view of the gripping device of FIG. 18; and

FIG. 21 is a perspective view of a further fire hose gripping device.

DETAILED DESCRIPTION OF THE PREFERRED EMBODIMENTS

Figure 4:
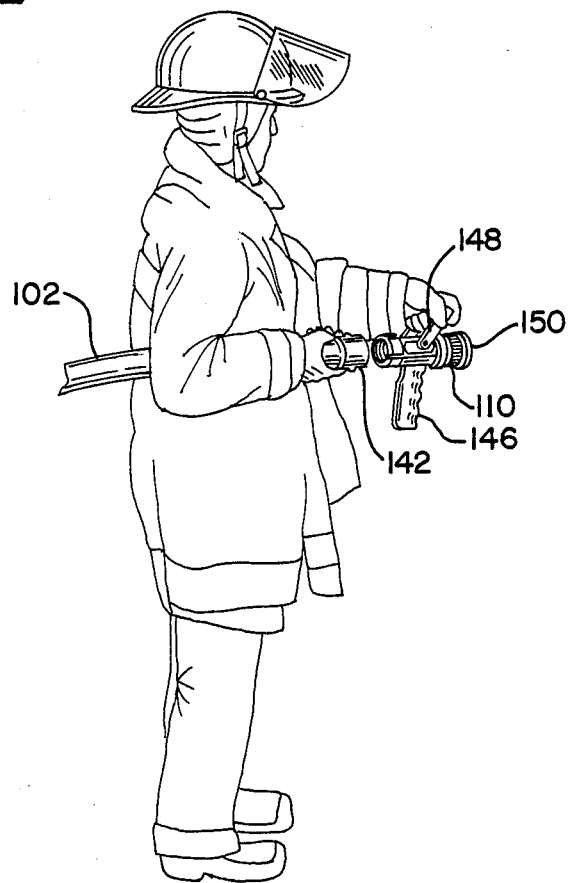
FIG. 4 is a perspective view of a pistol grip nozzle being attached to a fire hose.

The compact, portable, fire hose gripping device 100 shown in FIGS. 1 and 7–17 provides a quick release fire hose clamp, fork, and slip resistant hose grip which can readily receive, slide upon, and securely grip a fire hose 102. The fire hose gripping device is easy to use, reliable, and comfortable. Advantageously, it reduces hand cramps, fatigue, and fire hose slippage. It also enhances the safety and endurance of firemen. Desirably, it can conveniently fit and be stored in the pocket of a shirt, pants, raincoat, or bunker gear.

As shown in FIGS. 11–17, the fire hose gripping device 100 has a rigid, stationary, symmetrical, U-shaped, c-shaped, or n-shaped, composite hose-engaging, gripping member 104. The gripping member 104 grips, grasps, receives, and engages an expandable fire hose 102 (FIG. 1) filled with water. The composite gripping member 104 can be made of metal, such as spiral rebar and coated with a heat resistant, water impervious coating 106, such as rubber or epoxy resin, which will not melt or otherwise deform when placed near petroleum fires. The coating also protects the metal core 108 from rusting from prolonged exposure to water spray from the nozzle 110 (FIG. 1) as well as from gases emitted from the fire. The metal core 108 has complementary, symmetrical sets of semispiral ribs 112 which facilitate gripping of the fire hose.

The fire hose gripping member 104 (FIGS. 11–17) has an open end 114 and a closed end 116. The open end 114 provides a mouth and access opening to receive and be inserted about a filled fire hose. The closed end comprises an intermediate, straight vertical bight 116 which engages, grasps, and supports the water filled fire hose. A pair of fixed, parallel, straight horizontal arms 118 and 120 provide upper and lower arms which are welded or otherwise fixedly connected to the upper and lower ends, respectively, of the bight 116. In the embodiment of FIGS. 11–17, the arms 118 and 120 are the same length, in vertical alignment, and are perpendicular to the bight 116. The attached ends of the arms 118 and 120 are cantilevered from and fixedly attached to the ends of the vertical bight 116. The intersection and corners of the arms and bight are rounded. The unattached free ends 122 and 124 of the arms 118 and 120 are positioned about the open end and are rounded. The minimum span (distance) between the arms 118 and 120, as well as of the mouth and access opening of the open end 114 are greater than the maximum diameter and transverse span of the filled fire hose 102 (FIG. 8) to provide a clearance space between the upper arm 118 and the fire hose 102 so as to permit the hose gripping member 104 to slide to different positions along the hose 102.

In order to comfortably grip the hose clamp 100 (FIGS. 11–17) and facilitate lifting and carrying of the fire hose with the hose gripping member 104, the hose gripping device 100 has a handle assembly 126 which extends upwardly and outwardly from the middle portion of the upper arm 118 in a direction away from the fire hose. The handle assembly 126 has an upright straight, composite handle bar 128 which is welded or otherwise fixedly connected to the middle portion of the upper arm 118 and a manually grippable, elastomeric, resilient outer handle 130. The handle bar 128 can be made of spiral rebar and coated with rubber in a manner similar to the composite gripping member 104. The handle 130 annularly surrounds the bar 128 and has an internal cavity 132 (FIG. 17) which provides a recess opening to snugly receive and engage the bar 128. The handle 130 is positioned parallel to the upright bight 116 and perpendicular to the arms 118 and 120. The handle assembly 126 can have an upper circular end cap 134 (FIGS. 11–16) and a lower annular end cap 136. The lower cap 136 can be spaced above the upper arm 118. The handle 130 can be made of rubber or rubber-like plastic.

Figure 5:
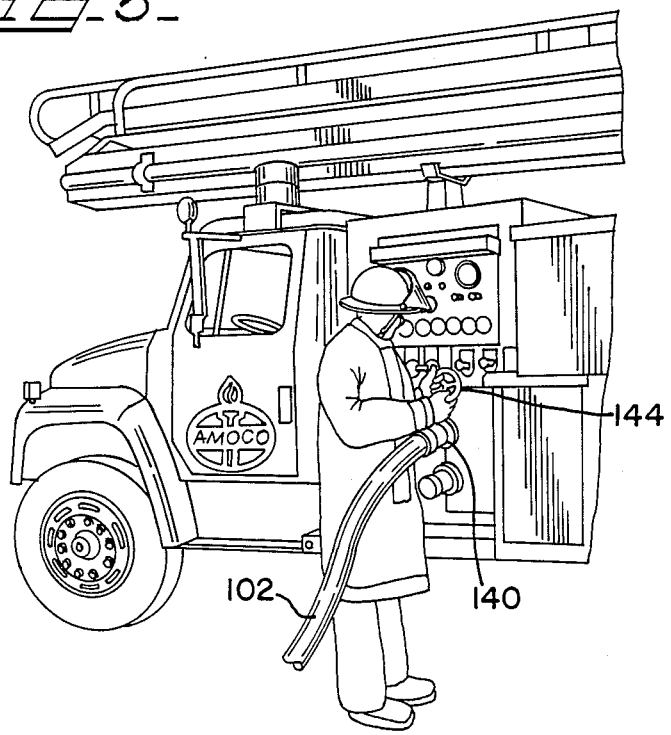
FIG. 5 is a perspective view of a portion of the fire hose being filled with water.

In use, when the rearward end of the fire hose 102 is in a collapsed generally flat condition, the internally threaded rear coupling 140 at the rearward end of the fire hose 102 is threadedly attached and coupled to a fire truck as shown in FIG. 2 or other water supply source, such as a fire hydrant or water tank. The fire hose 102 is then uncoiled as shown in FIG. 3. A manually grippable spray nozzle, such as the pistol grip nozzle 110 of FIG. 4, is threadedly attached and securely connected to the internally threaded front coupling 142 at the front end of the fire hose 102. Afterwards, a fireman can open the water valve 144 of the fire truck or other water source to fill, expand, and inflate the hose 102 with water to an expanded semirigid position as shown in FIG. 5. The water-filled fire hose 102 can then be grasped, lifted, and carried by at least one hand of one of the firemen as shown in FIG. 6.

In order to firmly grasp and comfortably hold the fire hose 102, the fireman can grip the handle 130 of the fire hose gripping device 100 as shown in FIG. 6 and insert the hose-gripping member 104 on and about the hose 102 as shown in FIG. 7. The handle 130 can be held vertically above the fire hose 102 to comfortably lift and pull the hose as shown in FIG. 7, or can be held vertically below the hose to comfortably lift and push the hose. Alternatively, the handle 130 can be held transversely, laterally, or horizontally, if desired. In any event, there should be sufficient clearance between one of the arms 118 or 120 (FIG. 8) of the hose gripping member 104 and the water-filled fire hose when the hose gripping member 104 is inserted on and about the hose to manually slide the hose gripping member 104 forwardly and rearwardly along the fire hose 102 to other positions as desired by the firemen by pushing or pulling the gripping device 100.

In order to interlockingly engage, detachably secure and firmly clamp the hose gripping member 104 against the water-filled fire hose 102 without any additional fasteners, the hose gripping member is moved at an acute or an oblique angle of inclination relative to the length of the fire hose 102. This can be accomplished by tilting the handle 130 of the gripping device 100 towards the spray nozzle 110 as shown in FIG. 1 or by tilting the handle rearwardly away from the spray nozzle 110 as shown in FIG. 10. Alternatively, this can be accomplished by twisting the gripping member 104 relative to the water-filled fire hose 102 as shown in FIG. 9. In any event, during interlocking engagement and clamping of the hose 102 by the hose gripping member 104, the effective span, cross-sectional area, and opening between the arms 118 and 120 of the gripping member as viewed normal and perpendicular to water-filled fire hose 102 is slightly less than the maximum expanded diameter of the water-filled hose so that the gripping member 104 can securely lock and firmly grasp the fire hose 102 without any moving parts.

Once the fire hose 102 is securely held and comfortably grasped by the gripping device 100, the water-filled fire hose 102 can be elevated by lifting the handle 130 of the gripping device. While one fireman can lift, control, and maneuver the fire hose with the gripping device 100, it is preferred that a second firemen hold the pistol grip 146 (FIGS. 1 and 4) of the spray nozzle 110 with one hand and grasp the upper U-shaped handle 148 of the nozzle 110 with the other hand to direct and point the spray head 150 of the nozzle 110 towards the fire and spray water on the fire as shown in FIG. 1. Desirably, one or more other firemen can lift and cradle the fire hose rearwardly of the first fireman and gripping device 100. Each of the firemen can use a similar hose gripping device 100 on the fire hose.

In order to unlock, unclamp, and release the hose gripping device 100 from the fire hose 102, to either slide the gripping device 100 to another position along the fire hose 102 or to remove the gripping device 100 from the hose 102, the handle 130 of the hose gripping device 100 is moved to a position perpendicular (normal) to the fire hose 102, such as with the handle in an upward position as shown in FIG. 7, so that there is a clearance space between the fire hose 102 and one of the arms 118 or 120 of the gripping device 100. In this position, the cross-sectional area and space between the arms 118 and 120 of the hose gripping device 100 is greater than the maximum expanded diameter and transverse cross-section area of the water-filled fire hose 102 as shown in FIG. 8.

The fire hose gripping device 200 of FIGS. 18-20 are structurally and functionally similar to the fire hose gripping device 100 of FIGS. 1 and 7-17, and used in a similar manner, except that the gripping member 204 and handle bar 228 comprise knurled metal, such as aluminum, with diamond-shaped projections or ribs 229 thereon to facilitate gripping of the fire hose.

The fire hose gripping device 300 of FIG. 21 is structurally and functionally similar to the fire hose gripping device 100 of FIGS. 1 and 7-17, and used in a similar manner, except that the gripping member 304 is semi-circular or rounded. While the fire hose gripping device 100 is preferred for best results and ease of use, it may be desirable in some circumstances to use the gripping device 300 with a semi-circular or rounded gripping member 304.

The fire hose gripping device 100 of FIGS. 1 and 7-17 was tested at the Amoco Oil Company Refinery at Casper, Wyo. The tests achieved unexpected surprisingly good results. One fireman with one hose gripping device 100 was able to hold and control the fire hose more effectively and comfortably than two firemen without the hose gripping device 100. The hose gripping device 100 also enhanced the maneuverability and control of the fire hose and the endurance of the firemen.

Among the many advantages of the novel fire hose gripping devices and firefighting process of the present invention are:

1. Less fatigue and hand cramps for firemen.
2. Greater control and maneuverability of fire hoses.
3. Enhanced safety of firemen.
4. More comfortable for firemen.
5. Better ability to fight and quench fires.
6. Improved gripping of fire hoses.
7. Less slippage of fire hose.
8. Compact.
9. Portable.
10. Convenient.
11. Economical.
12. Dependable.
13. Efficient.
14. Effective.

Although embodiments of the invention have been shown and described, it is to be understood that various modifications and substitutions, as well as rearrangements of parts and process steps, can be made by those skilled in the art without departing from the novel spirit and scope of this invention.

What is claimed is:

1. A firefighting process, comprising the steps of:
   attaching one end of a fire hose to a fire hydrant when said end of said fire hose is in a generally collapsed flattened position;
   uncoiling said fire hose;
   attaching a manually grippable spray nozzle to the other end of said fire hose;
   inflating and substantially filling said fire hose with water from said water supply means to expand said hose to a semirigid expanded position;
   grasping, lifting, and carrying said filled fire hose with one hand;
   gripping a vertical elastomeric handle of a hose clamp with the other hand, said hose clamp having a generally U-shaped hose-engaging member, said U-shaped hose-engaging member having an open end defining an access opening for receiving said hose, said access opening being larger than the maximum diameter and transverse span of said uncoiled filled fire hose;
   inserting said hose-engaging member on said fire hose such that there is sufficient clearance between said hose-engaging member and said fire hose to side said hose clamp to another position;

moving said hose clamp at an acute angle of inclination relative to said hose to detachably secure and inter-lockingly engage said hose-engaging member to said filled fire hose;

manually lifting said vertical elastomeric handle of said hose clamp to elevate said fire hose;

pointing said nozzle towards said fire; and spraying water from said nozzle on said fire.

2. A firefighting process in accordance with claim 1 wherein said nozzle has a pistol grip and a second fireman holds said pistol grip with one hand and grasps other portions of the nozzle with the other hand to direct and point said nozzle towards said fire, and another fireman lifts and cradles said hose at a position substantially rearwardly of said hose clamp.

3. A firefighting process in accordance with claim 1 including twisting handle and said hose-engaging member of said hose clamp on said filled hose to detachably secure said hose-engaging member to said hose.

4. A fire hose gripping device, comprising:

a generally U-shaped hose-engaging member for engaging and receiving an expandable fire hose substantially filled with water, said hose-engaging member having a pair of substantially parallel arms comprising a substantially horizontal lower arm and a substantially horizontal upper arm, an intermediate bight extending between and connected to said horizontal arms, said bight comprising a substantial vertically straight portion and cooperating with said arms to provide a closed end of said hose-engaging member, each of said arms having an attached end cantilevered from and fixedly attached to said bight and having an unattached free end, said upper arm having a middle portion positioned between the ends of said upper arm, said unattached free ends of said arms being spaced from each other, said hose-engaging member having an open end between said unattached free ends of said horizontal arms, said open end defining a mouth providing an access opening having a minimum span greater than the maximum transverse diameter of said filled fire hose; and a handle assembly extending substantially upwardly from said middle portion of said upper horizontal arm and outwardly from said hose-engaging member in a direction away from said fire hose for lifting and carrying said fire hose in said hose-engaging member, said handle assembly being positioned substantially parallel to said vertical straight portion of said bight, said handle assembly comprising a substantially upright straight handle bar connected to and extending upwardly from said middle portion of said upper arm between the ends of said upper arm and comprising a manually grippable elastomeric outer handle annularly surrounding and substantially covering said handle bar, and said elastomeric outer handle having an internal cavity defining a recess opening for snugly receiving said handle bar.

5. A fire hose gripping device in accordance with claim 4 wherein said straight horizontal arms are substantially the same length and said bight is substantially perpendicular to said horizontal arms, and said handle assembly further comprises an upper circular end cap and a lower annular end cap.

* * * * *

UNITED STATES PATENT OFFICE
CERTIFICATE OF CORRECTION

Patent No. 4,856,834　　　　　　　　　Dated　August 15, 1989

Inventor(s)　　David R. Lancaster, Richard J. Everding

It is certified that error appears in the above-identified patent and that said Letters Patent is hereby corrected as shown below:

| Col. | Line | |
|---|---|---|
| 6 | 67 | "side" should read --slide-- |

Signed and Sealed this

Twenty-seventh Day of October, 1992

Attest:

DOUGLAS B. COMER

*Attesting Officer*　　　Acting Commissioner of Patents and Trademarks